(12) United States Patent
Watson

(10) Patent No.: US 10,897,879 B2
(45) Date of Patent: Jan. 26, 2021

(54) AQUARIUM WITH CREATURE FEATURE

(71) Applicant: PetSmart Home Office, Inc., Phoenix, AZ (US)

(72) Inventor: Jeffrey Stocker Watson, Phoenix, AZ (US)

(73) Assignee: PetSmart Home Office, Inc., Phoenix, AZ (US)

( * ) Notice: Subject to any disclaimer, the term of this patent is extended or adjusted under 35 U.S.C. 154(b) by 391 days.

(21) Appl. No.: 15/885,400

(22) Filed: Jan. 31, 2018

(65) Prior Publication Data

US 2018/0213754 A1    Aug. 2, 2018

Related U.S. Application Data

(60) Provisional application No. 62/453,320, filed on Feb. 1, 2017.

(51) Int. Cl.
*A01K 63/00* (2017.01)

(52) U.S. Cl.
CPC ................. *A01K 63/006* (2013.01)

(58) Field of Classification Search
CPC .... A01K 63/006; A01K 63/00; A01K 63/003; A01K 63/06
See application file for complete search history.

(56) References Cited

U.S. PATENT DOCUMENTS

| | | | | | |
|---|---|---|---|---|---|
| 1,297,254 | A | * | 3/1919 | Sato | A01K 63/003 |
| | | | | | 119/267 |
| 1,762,634 | A | * | 6/1930 | Motogo | A01K 63/06 |
| | | | | | 119/267 |
| D97,759 | S | * | 12/1935 | Carnes | D30/103 |
| D136,064 | S | * | 7/1943 | Fordyce | D30/103 |
| 3,113,555 | A | * | 12/1963 | Overman | A01K 63/003 |
| | | | | | 119/269 |
| 3,903,642 | A | * | 9/1975 | Yellin | A01K 63/003 |
| | | | | | 47/69 |

(Continued)

FOREIGN PATENT DOCUMENTS

| | | |
|---|---|---|
| CN | 104335953 A | 2/2015 |
| CN | 104663558 A | 6/2015 |

(Continued)

OTHER PUBLICATIONS

Machine translation of JP H0724004-U to Nisso Industry Co., Ltd., published May 1995.*

(Continued)

*Primary Examiner* — Kathleen I Alker
(74) *Attorney, Agent, or Firm* — Duane Morris LLP

(57) ABSTRACT

A combination aquarium with an eye-catching design is disclosed. The apparatus includes a bowl that is removably received and supported by a lower receptacle having first sidewalls which curve in a concave-up fashion and are dimensioned to receive and support a lower portion of the body of the bowl, and an upper receptacle dimensioned to be removably positioned over an upper portion of the body of the bowl and having an opening which substantially aligns with an opening at the top of the bowl, where the upper receptacle has second sidewalls which curve in a concave-down fashion.

8 Claims, 5 Drawing Sheets

(56) References Cited

U.S. PATENT DOCUMENTS

| | | | | |
|---|---|---|---|---|
| 3,939,338 A * | 2/1976 | Giammalvo | A01K 63/003 | 362/122 |
| 4,026,243 A * | 5/1977 | Jessop, III | A01K 63/003 | 119/246 |
| 4,272,372 A * | 6/1981 | Fonseca | A01K 63/003 | 210/167.25 |
| 4,481,905 A * | 11/1984 | Fonseca | A01K 63/042 | 119/261 |
| 4,525,950 A * | 7/1985 | Glassman | A47G 7/06 | 428/13 |
| D291,426 S * | 8/1987 | Husbands | D11/145 | |
| 5,165,778 A * | 11/1992 | Matthias | A01K 63/06 | 362/101 |
| 5,197,409 A | 3/1993 | Hammond | | |
| D349,979 S * | 8/1994 | Ulloa | D30/101 | |
| 5,347,952 A * | 9/1994 | Tsai | A01K 63/003 | 119/246 |
| 5,632,377 A * | 5/1997 | Ferrero | A23G 3/50 | 206/457 |
| D463,073 S * | 9/2002 | Van Vlake | D30/103 | |
| D554,432 S * | 11/2007 | Roth | D7/510 | |
| 7,341,022 B2 * | 3/2008 | Ming | A01K 63/003 | 119/245 |
| 7,544,290 B2 * | 6/2009 | Pulice | A01K 63/003 | 119/259 |
| D609,606 S * | 2/2010 | Hsu | D11/158 | |
| 7,699,487 B2 * | 4/2010 | Schafer | F21S 6/006 | 362/122 |
| 8,393,298 B2 * | 3/2013 | Andon | A01K 63/003 | 119/245 |
| D684,730 S * | 6/2013 | Grabois | D21/604 | |
| D693,521 S * | 11/2013 | Xu | D26/51 | |
| 8,727,554 B2 * | 5/2014 | Blake | A01K 61/85 | 362/101 |
| 8,875,660 B2 * | 11/2014 | Grabois | A01K 63/003 | 119/247 |
| 10,334,827 B2 * | 7/2019 | Chattin | A01K 63/003 | |
| 2005/0039391 A1 * | 2/2005 | Morse | A47G 7/041 | 47/39 |
| 2005/0241590 A1 * | 11/2005 | Koznarek | A01K 67/04 | 119/270 |
| 2008/0266836 A1 * | 10/2008 | Hadley | A01K 63/06 | 362/101 |
| 2012/0174870 A1 | 7/2012 | Grabois | | |
| 2014/0223819 A1 * | 8/2014 | Coghlan | A01G 31/02 | 47/62 R |
| 2016/0212979 A1 | 7/2016 | Allen et al. | | |
| 2017/0290307 A1 * | 10/2017 | Boschert | A01K 63/06 | |

FOREIGN PATENT DOCUMENTS

| | | | | |
|---|---|---|---|---|
| CN | 204930010 U | | 1/2016 | |
| JP | H0724004 U | * | 5/1995 | ............ A01K 63/00 |
| JP | 2006217887 A | * | 8/2006 | ............ A01K 63/00 |

OTHER PUBLICATIONS

1978 Garfield Fish Tank, https://www.worthpoint.com/worthopedia/1978-garfield-fish-tank-lighted-254121222, date: 1978.*

* cited by examiner

AQUARIUM WITH CREATURE FEATURE

CROSS-REFERENCE TO RELATED APPLICATION

This application claims priority benefit to U.S. Provisional Application Ser. No. 62/453,320 entitled "Aquarium with Creature Feature" filed 1 Feb. 2017, the entirely of which is hereby incorporated herein by reference.

BACKGROUND

Aquariums provide an aesthetically pleasing, relaxing display of motion and color. Aquatic scenes also promote curiosity and interest as they capture the eye and imagination of a viewer. However, typical prior art aquariums are constructed of planar or curved transparent materials arranged in a simple geometric shape that typically are not eye-catching, thereby diminishing the impact of the overall display. Accordingly, it would be beneficial to combine the aesthetic aspects of an aquatic scene with a visually-vibrant and eye-catching aquarium to capture a viewer's attention and enhance the viewing pleasure and/or the ambience of a room.

SUMMARY

In some embodiments of the present disclosure, an apparatus which combines an aquarium container supported by a lower receptacle and covered by an upper receptacle is disclosed. In some embodiments the container is bowl-shaped and includes a body portion and a neck portion at a top of the bowl defining an opening at the top of the bowl. The lower receptacle is dimensioned to removably receive and support the bowl, and the lower receptacle includes first sidewalls which curve in a concave-up fashion and are dimensioned to receive and support a lower portion of the body of the bowl. The upper receptacle is dimensioned to be removably positioned over an upper portion of the body of the bowl and includes an opening which substantially aligns with the opening at the top of the bowl, the upper receptacle includes second sidewalls which curve in a concave-down fashion and which rest on the upper portion of the body of the bowl.

In other embodiments, the apparatus includes one or more of: an electrical connector in the lower receptacle; an elongated tube portion having a proximal end connected to the lower receptacle; a light unit connected to a distal end of the elongated tube, where the light unit includes a lighting element that is electrically connected to the electrical connector via a wire through the elongated tube; the elongated tube being dimensioned to support the light unit at a predetermined height above the opening of the bowl such that light emitted by the lighting element shines into the bowl; a portion of the light unit is translucent; a portion of the light emitted by the lighting element shines through said light unit; the light unit comprises a light emitting diode; the light unit comprises an eyeball design or a triple eyeball design.

In a further embodiment, the first and second sidewalls are dimensioned to abut each other along the body of the bowl. In a still further embodiment, the apparatus further includes a third opening for viewing the bowl, where the third opening is circumscribed by a bottom portion of the lower receptacle, a top portion of the upper receptacle, and the first and second sidewalls.

Another embodiment includes an apparatus comprising: a bowl including a body portion, a bottom portion connected to the body portion, and a neck portion at a top of the bowl defining a first opening at the top of the bowl; a base dimensioned to removably receive and support the bowl, the base comprising: a central portion dimensioned to receive the bottom portion of the bowl, a lower receptacle dimensioned to support the bowl when the bowl is resting on the central portion, the lower receptacle having extended first and second sidewalls, where the first and second sidewalls are disposed on a first and second side, respectively, of the base, and where each of the first and second sidewalls extends from the base upwards along a lower portion of the body of the bowl when the bowl is resting on the central portion, and an electrical connector; an elongated tube portion having a proximal end connected to the base; a light unit connected to a distal end of the elongated tube, the light unit including a lighting element that is electrically connected to the electrical connector via a wire through the elongated tube; and an upper receptacle dimensioned to be removably positioned over an upper portion of the body of the bowl and having a second opening which substantially aligns with the first opening, the upper receptacle having extended third and fourth sidewalls, where the third and fourth sidewalls are disposed on a first and second side, respectively, of the upper receptacle, and where each of the third and fourth sidewalls extends from the upper receptacle downwards along an upper portion of the body of the bowl when said upper receptacle is resting on the bowl, where the first and third sidewalls are dimensioned to abut each other along the body of the bowl thereby forming a first member, and where the second and fourth sidewalls are dimensioned to abut each other along the body of the bowl thereby forming a second member, such that a third opening is formed which is circumscribed by the upper and lower receptacles and the first and second members, and where the elongated tube is dimensioned to support the light unit at a predetermined height above the opening of the bowl such that light emitted by the lighting element shines into the bowl.

In further embodiments of the apparatus: a portion of the light unit is translucent; a portion of the light emitted the lighting element shines through the light unit; the light unit comprises a light emitting diode; the light unit comprises an eyeball design or a triple eyeball design. In still further embodiments of the apparatus: at least one fin-shaped element is attached to either the upper or lower receptacle; a portion of the base comprises at least one clawed foot.

These and other embodiments will become apparent to one of skill in the art upon the reading and understanding of the attached figures and associated detailed description.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific aquariums, it is to be understood that the discussion is not intended to limit the scope of the present subject matter in any way and that the principles presented are equally applicable to other systems and/or methods for remote measurement and process control solutions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of an aquarium are described.

Figure 1:
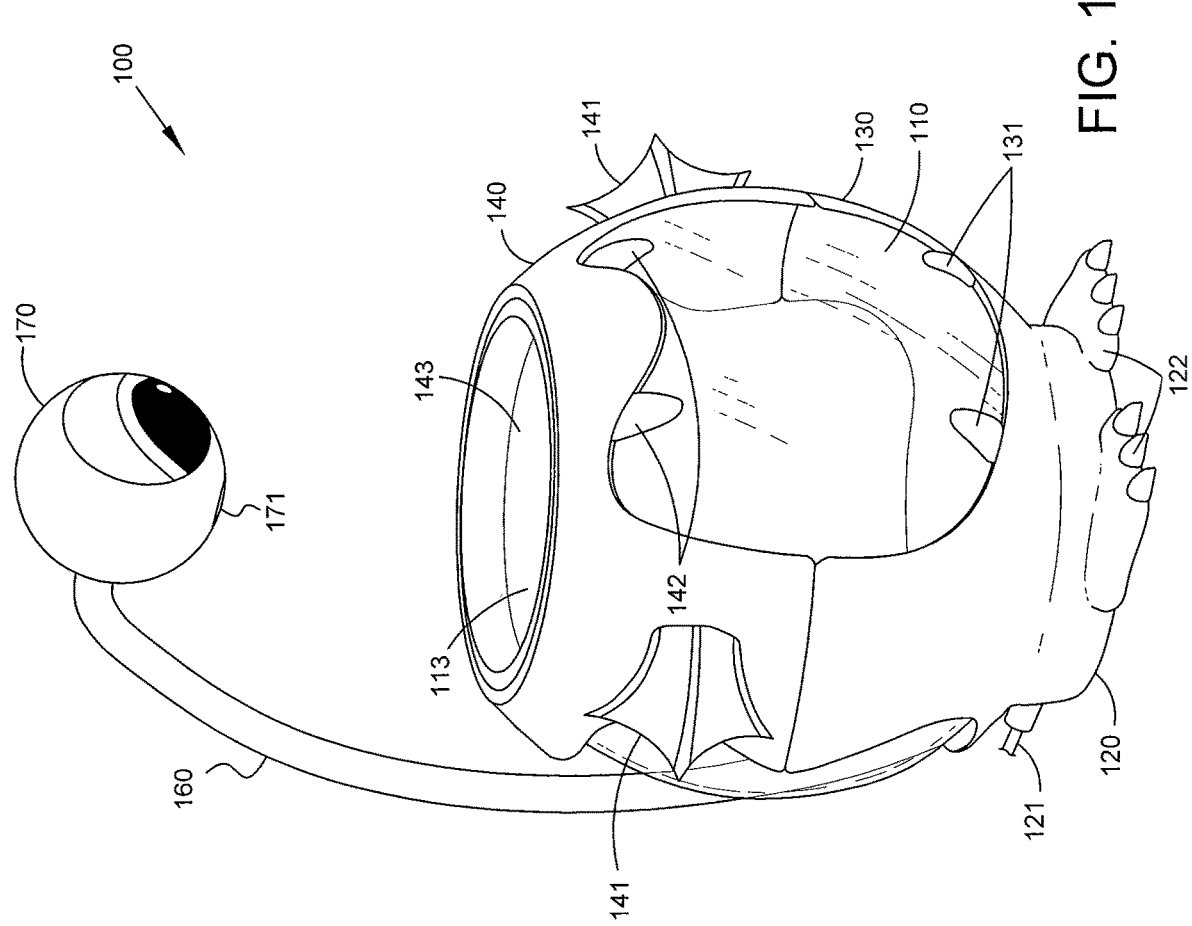
FIG. 1 is a perspective view of an aquarium according to an embodiment of the present subject matter.

With attention drawn to FIG. 1, a perspective view of an aquarium 100 according to an embodiment of the present subject matter is shown. The aquarium 100 includes a bowl 110, a base 120, a lower receptacle 130, an upper receptacle 140, an electrical connector 121, an elongated tube portion 160, and a light unit 170. The bowl 110 is typically made from a transparent material including, but not limited to, glass, plastic, acrylic, or any similar material. For convenience, the bowl depicted in FIG. 1 and described herein is shown as generally globular, however other shapes are contemplated (e.g., cubical, cylindrical, polyhedral, frustum, etc.) which will necessitate similar shaping for the upper and lower receptacles. The base 120 may be formed to include design elements such as, but not limited to, clawed feet 122. Additionally, the upper receptacle 140 may include added features such as fins 141, hands (not shown), or other design elements. Either or both of the lower receptacle 130 and the upper receptacle 140 may include design elements such as, but not limited to, teeth 131 and 142, respectively. The light unit 170 may be shaped in the form of a single eyeball, as shown, or may be shaped in the form of multiple (e.g., two, three, or more) eyeballs (not shown for clarity). Furthermore, the light unit 170 may include a light element 171.

Figure 2:
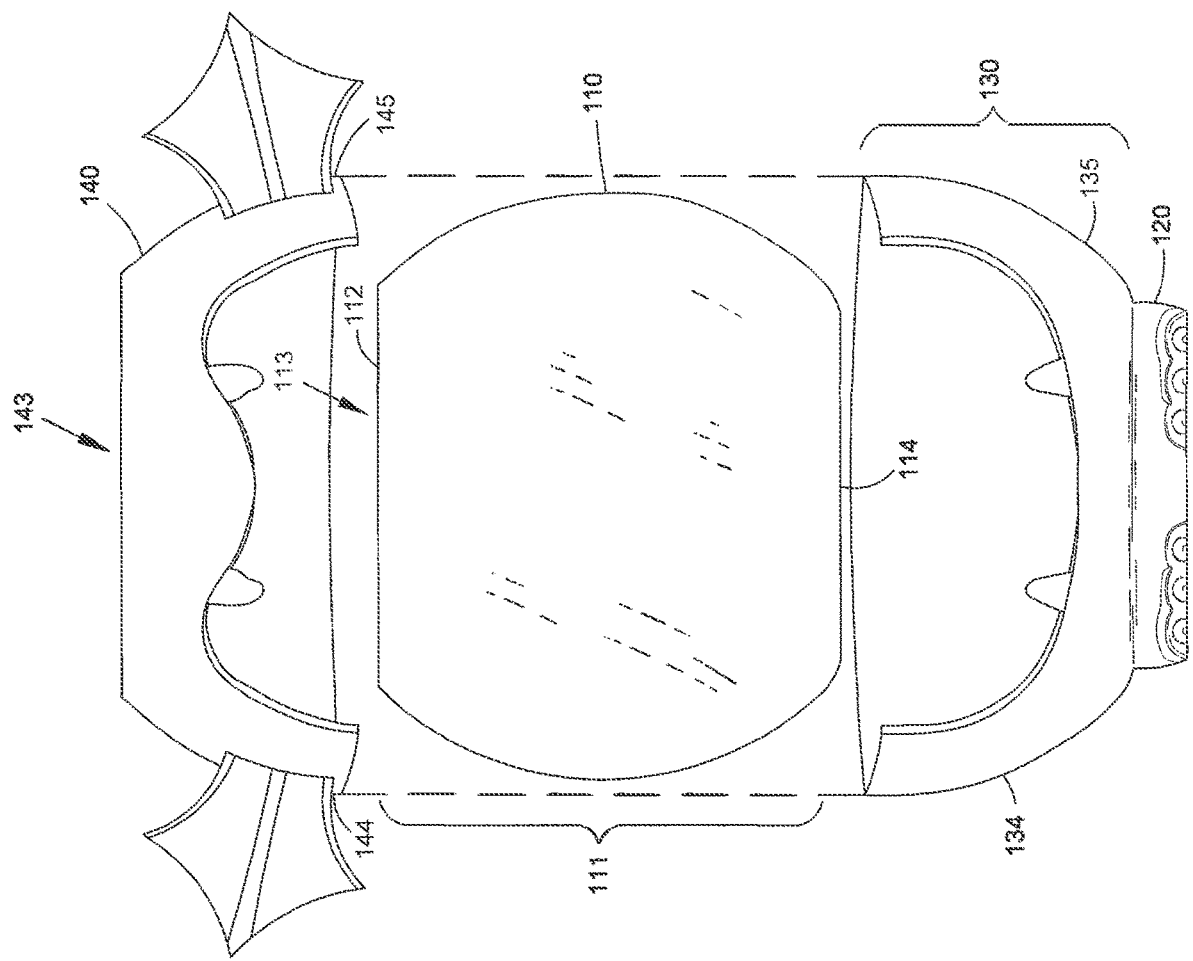
FIG. 2 is an exploded view of an aquarium showing a lower receptacle, a removable bowl, and a removable upper receptacle according to an embodiment of the present subject matter.

As shown in more detail in FIG. 2, the lower receptacle 130 is dimensioned to removably receive and support the bowl 110, and the upper receptacle 140 is dimensioned to be removably positioned over the top of the bowl 110. In an embodiment, the upper receptacle 140 rests on the top of the bowl 110. In another embodiment, the upper receptacle 140 is positioned over the top of the bowl 110 and is fully supported by the lower receptacle 130. These features allow for easy and convenient removal of the bowl for changing the water and/or cleaning. The bowl 110 includes a body portion 111, a neck portion 112 which forms an opening 113 at the top of the bowl, and a bottom portion 114. The upper receptacle 140 has an opening 143 which, when the upper receptacle 140 is positioned over the top of the bowl 110, substantially aligns with the opening 113 at the top of the bowl.

Figure 3:
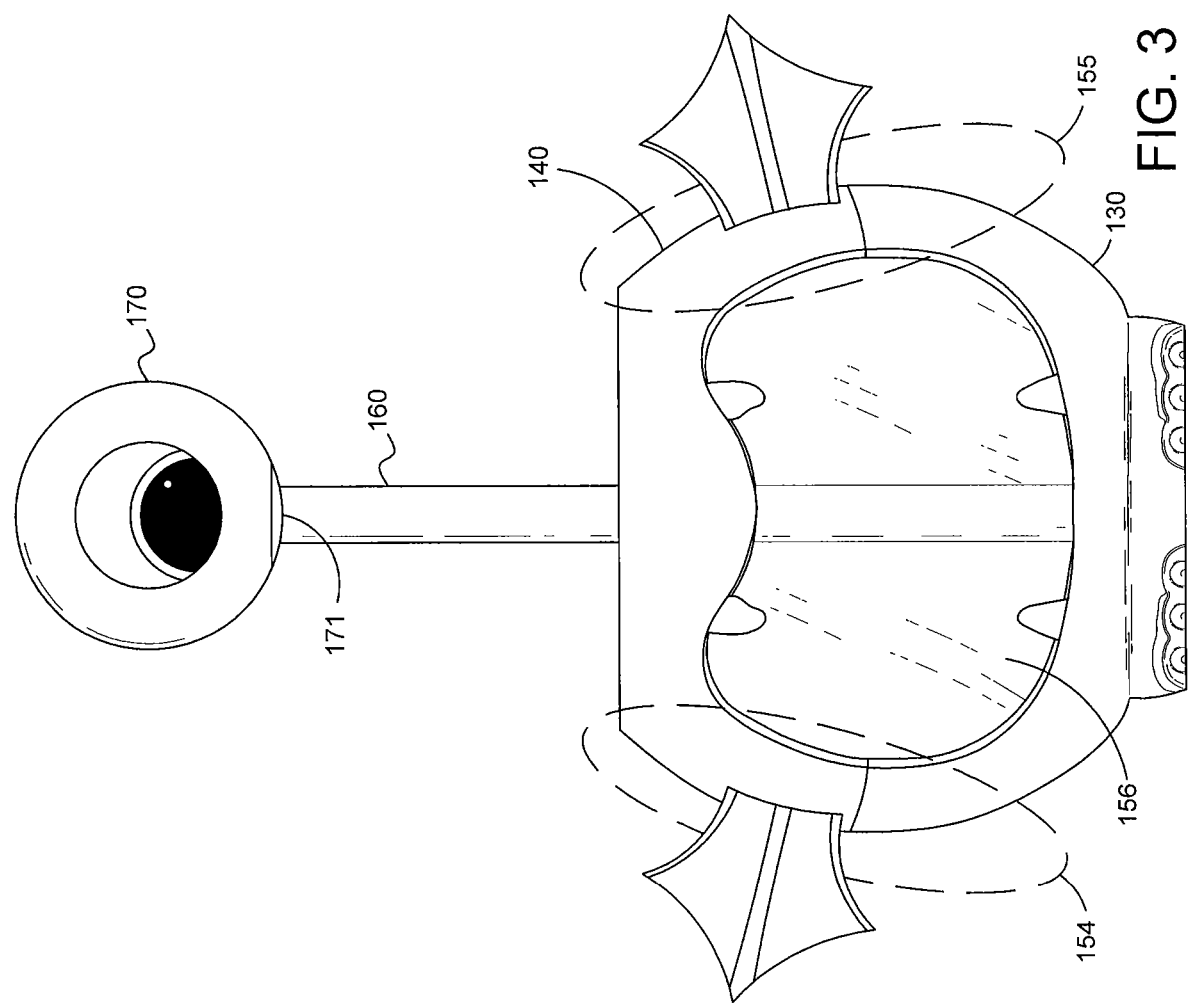
FIG. 3 is a front elevation view of an aquarium according to an embodiment of the present subject matter.
Figure 4:
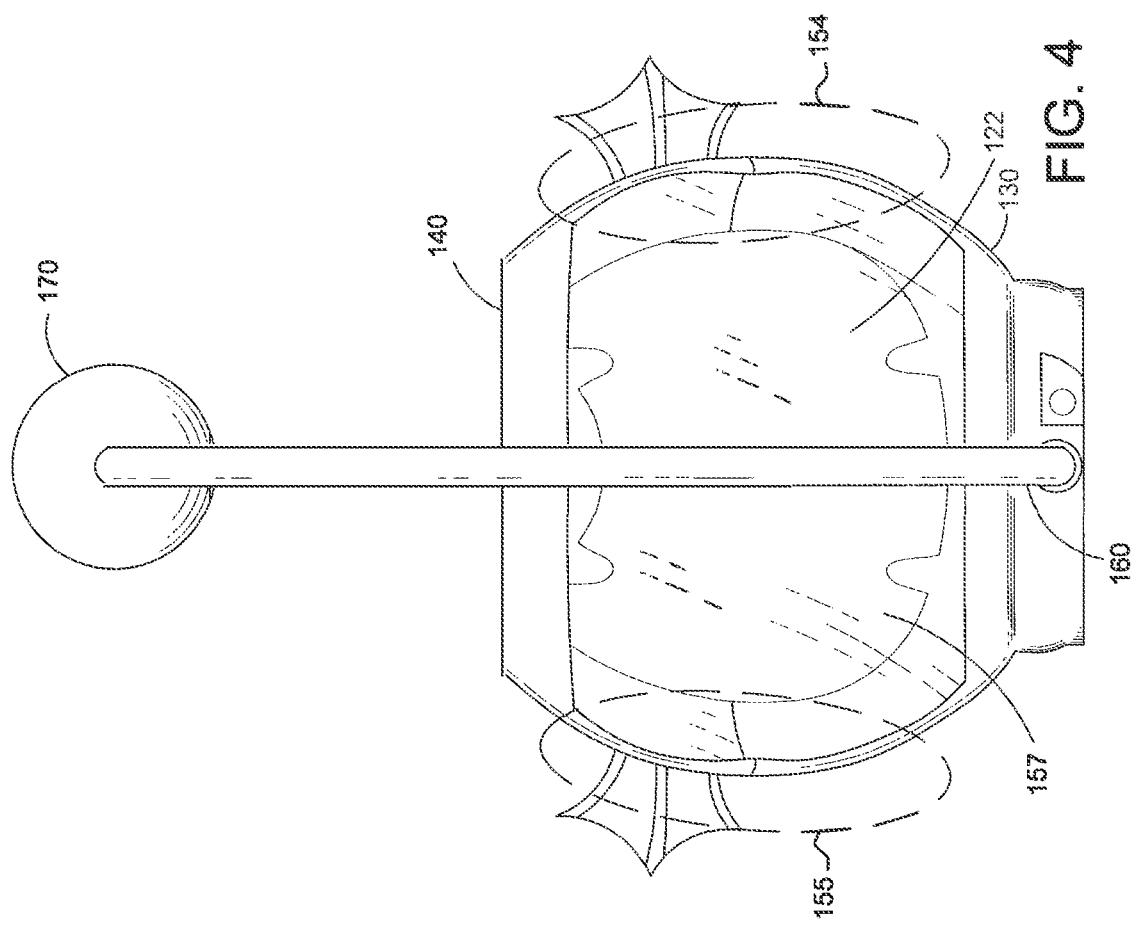
FIG. 4 is a rear elevation view of an aquarium according to an embodiment of the present subject matter.
Figure 5:
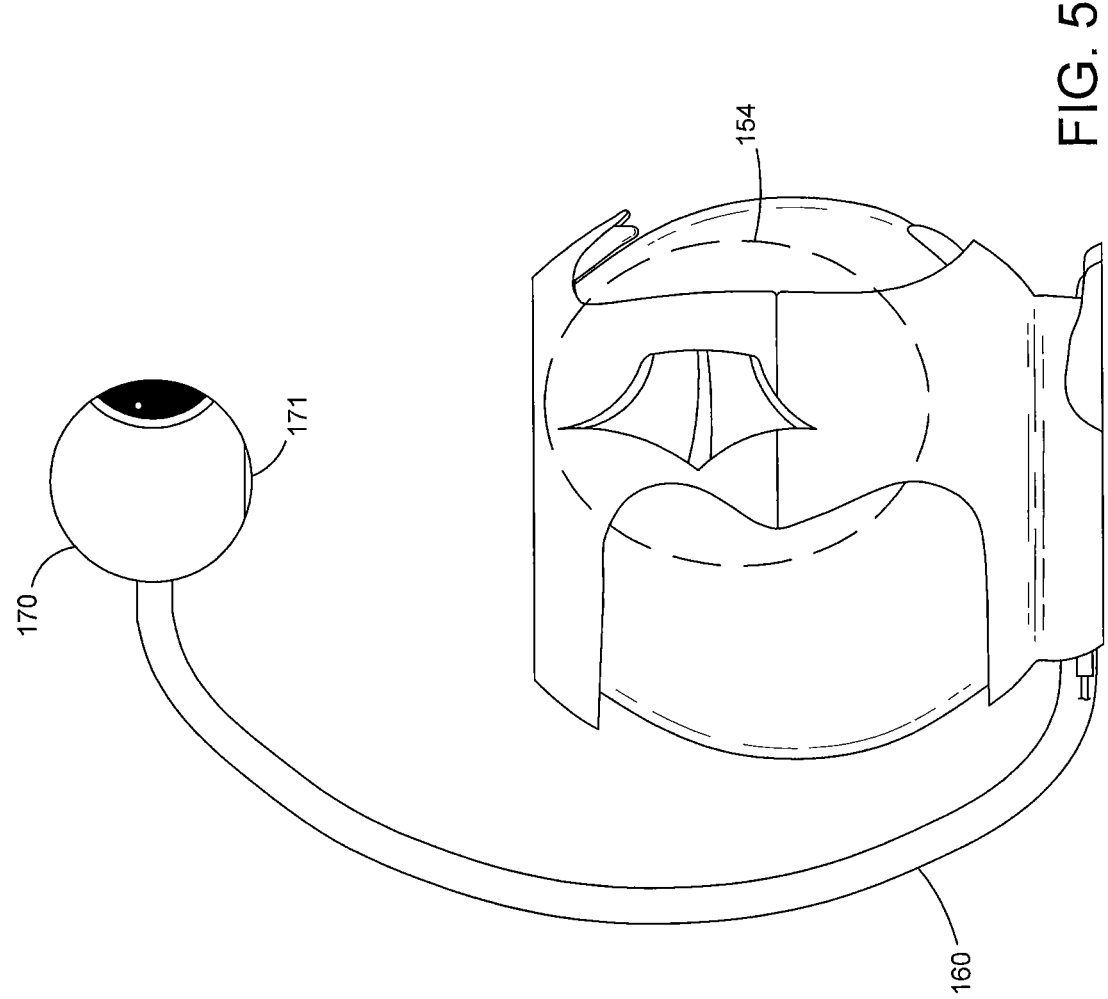
FIG. 5 is a side elevation view of an aquarium according to an embodiment of the present subject matter.

As further shown in FIG. 2, the lower receptacle 130 includes sidewalls 134 and 135 which are dimensioned to removably receive and support a lower portion of the bowl 110 and are generally curved upward in a concave-up fashion. The upper receptacle 140 includes sidewalls 144 and 145 which are dimensioned to be removably positioned over an upper portion of the bowl 110 and are generally curved downward in a concave-down fashion. In an embodiment, sidewalls 134 and 144 abut each other along the body portion 111 of the bowl 110 thereby forming a member 154, as shown in FIGS. 3, 4, and 5. Similarly, sidewalls 135 and 145 abut each other along the body portion 111 of the bowl 110 thereby forming a member 155, shown in FIGS. 3 and 4. Thus, an opening 156 for viewing the bowl 110, as shown in FIG. 3, is formed between members 154 and 155, and lower and upper receptacles 130 and 140. Similarly, an opening 157 is likewise formed for viewing the back of the bowl 110, as shown in FIG. 4, is formed between members 154 and 155, and lower and upper receptacles 130 and 140.

In an embodiment, the base 120 is firmly affixed to the lower receptacle 130 and the base includes a central portion 124 (shown in FIG. 2) dimensioned to receive the bottom 114 of the bowl 110. An elongated tube portion 160 (shown in FIGS. 1 and 3-5) has one end connected to the base 120 and a light unit 170 connected at the other end such that the light unit is suspended above the bowl 110 at a predetermined height. The light unit 170 includes a lighting element (not shown for clarity), such as, but not limited to, a light emitting diode, which is electrically connected to the electrical connector 121 via a wire through the elongated tube 160. In an embodiment, light emitted by the lighting element shines down from the light unit 170 into the bowl 110. In another embodiment, the light unit 170 is translucent and a portion of the light emitted by the lighting element shines through the light unit. In a further embodiment, only the eyeball design (whether one, two, three, or more eyeballs) of the light unit 170 is translucent and light emitted by the lighting element shines through the eyeball design.

Although examples are illustrated and described herein, embodiments are nevertheless not limited to the details shown, since various modifications and structural changes may be made therein by those of ordinary skill within the scope and range of equivalents of the claims.

I claim:

1. An apparatus comprising:
   a bowl including a body portion, a bottom portion connected to the body portion, and a neck portion at a top of said bowl defining a first opening at the top of said bowl;

a base dimensioned to removably receive and support the bowl, said base comprising:
- a central portion dimensioned to receive the bottom portion of the bowl;
- a lower receptacle dimensioned to support the bowl when the bowl is resting on the central portion, said lower receptacle having extended first and second sidewalls, wherein said first and second sidewalls are disposed on first and second sides, respectively, of the base, and wherein each of said first and second sidewalls extends from the base upwards along a lower portion of the body portion of the bowl when the bowl is resting on the central portion; and
- an electrical connector;

an elongated tube portion having a proximal end connected to the base;

a light unit connected to a distal end of the elongated tube, said light unit including a lighting element that is electrically connected to the electrical connector via a wire through the elongated tube; and an upper receptacle dimensioned to be removably positioned over an upper portion of the body portion of the bowl and having a second opening which substantially aligns with the first opening, said upper receptacle having extended third and fourth sidewalls, wherein said third and fourth sidewalls are disposed on a first and second side, respectively, of said upper receptacle, and wherein each of said third and fourth sidewalls extends from said upper receptacle downwards along said upper portion of the body portion of the bowl when said upper receptacle is resting on the bowl, wherein said first and third sidewalls are dimensioned to abut each other along the body portion of the bowl thereby forming a first member, and wherein said second and fourth sidewalls are dimensioned to abut each other along the body portion of the bowl thereby forming a second member, such that a third opening is formed which is circumscribed by the upper and lower receptacles and said first and second members, and wherein the elongated tube is dimensioned to support the light unit at a predetermined height above the opening of the bowl such that light emitted by the lighting element shines into the bowl.

2. The apparatus of claim 1 wherein a portion of said light unit is translucent.

3. The apparatus of claim 2 wherein a portion of the light emitted the lighting element shines through said light unit.

4. The apparatus of claim 1 wherein said light unit comprises a light emitting diode.

5. The apparatus of claim 1 wherein said light unit comprises an eyeball design.

6. The apparatus of claim 5 wherein said eyeball design comprises a single eyeball.

7. The apparatus of claim 1 wherein at least one fin-shaped element is attached to either the upper or lower receptacle.

8. The apparatus of claim 1 wherein a portion of the base comprises at least one clawed foot.

* * * * *